Figure 3:
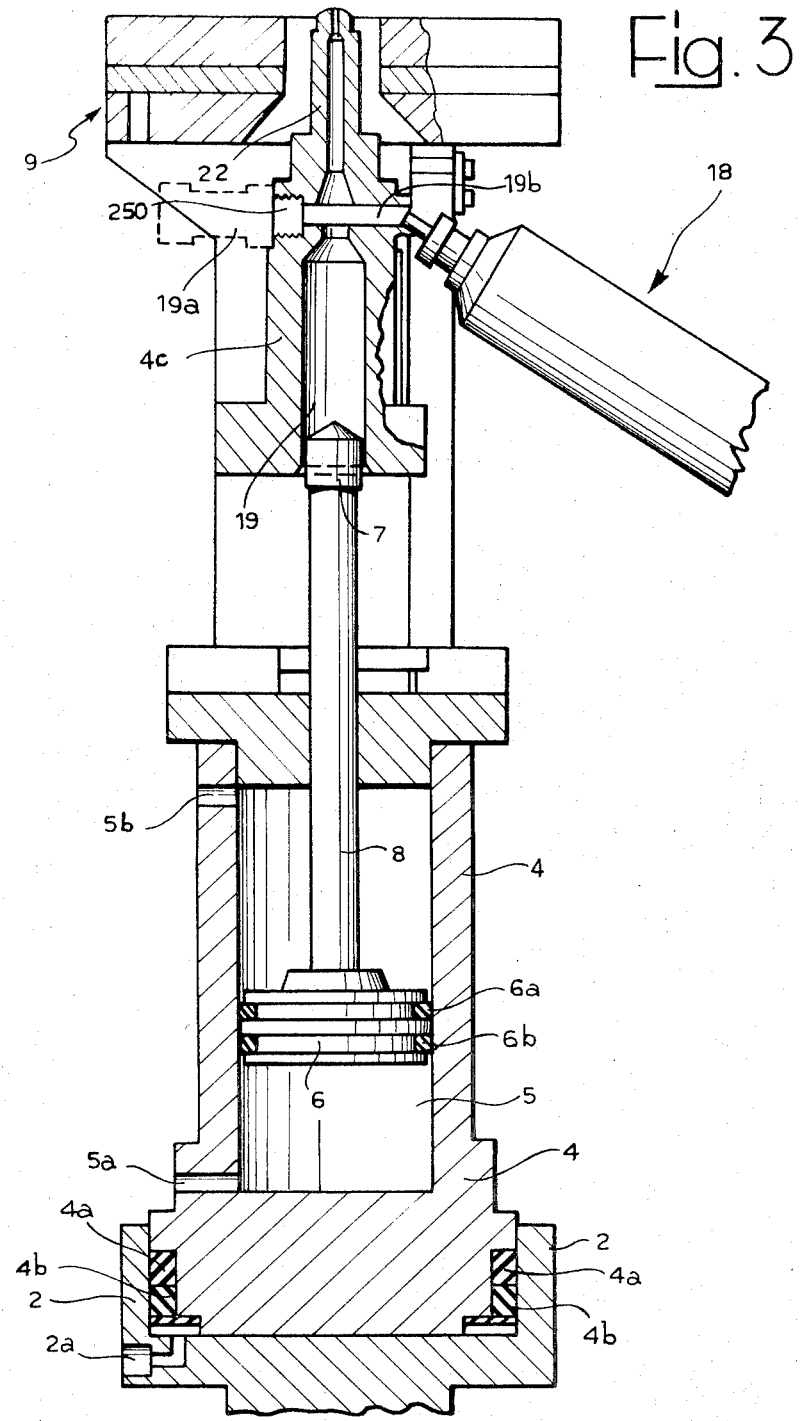

United States Patent

Vicini

[15] 3,695,809
[45] Oct. 3, 1972

[54] VERTICALLY CLOSING PRESS FOR INJECTION MOLDING THERMOPLASTIC, THERMOSETTING AND ELASTOMERIC MATERIALS

[72] Inventor: Dino Vicini, Milan, Italy
[73] Assignee: Mas Hydraulic & Vulcanizing Machinery Co., S.R.L., Milan, Italy
[22] Filed: July 31, 1970
[21] Appl. No.: 60,010

[52] U.S. Cl. .................................................. 425/450
[51] Int. Cl. ................................................. B29c 1/16
[58] Field of Search ............ 18/30 LM, 30 LA, 30 LD, 30 LE, 18/30 LF, 16 H, 16.5, 30 B, 30 QB, 30 LV; 425/450, 406, 408, 355

[56] References Cited

UNITED STATES PATENTS

| 3,195,186 | 7/1965 | Gautan et al. | 425/450 |
| 3,241,187 | 3/1966 | Nouel | 425/406 |
| 994,349 | 6/1911 | Updegraff | 18/16.5 X |
| 3,528,134 | 9/1970 | Fishbach | 18/30 LV |

FOREIGN PATENTS OR APPLICATIONS 1,006,590   1957   Germany ................. 18/30 LV Primary Examiner—J. Spencer Overholser
Assistant Examiner—David S. Safran
Attorney—Sughrue, Rothwell, Mion, Zinn & Macpeak

[57] ABSTRACT

A vertically closing press for injection molding comprising an upper platen and a lower platen, an upwardly mounted hydraulic cylinder for producing a quick approach of the upper platen to the lower platen, a transfer chamber fast with and located below the lower platen, and a combination of a hydraulic cylinder for closing and clamping a mold between the platens having a piston forming a further cylinder the piston rod of which provides a transfer plunger in the transfer chamber. An adjustable backing-up device for the upper platen is provided between the latter and the upper beam of the frame, the device being retractable laterally to permit raising of the upper platen.

4 Claims, 8 Drawing Figures

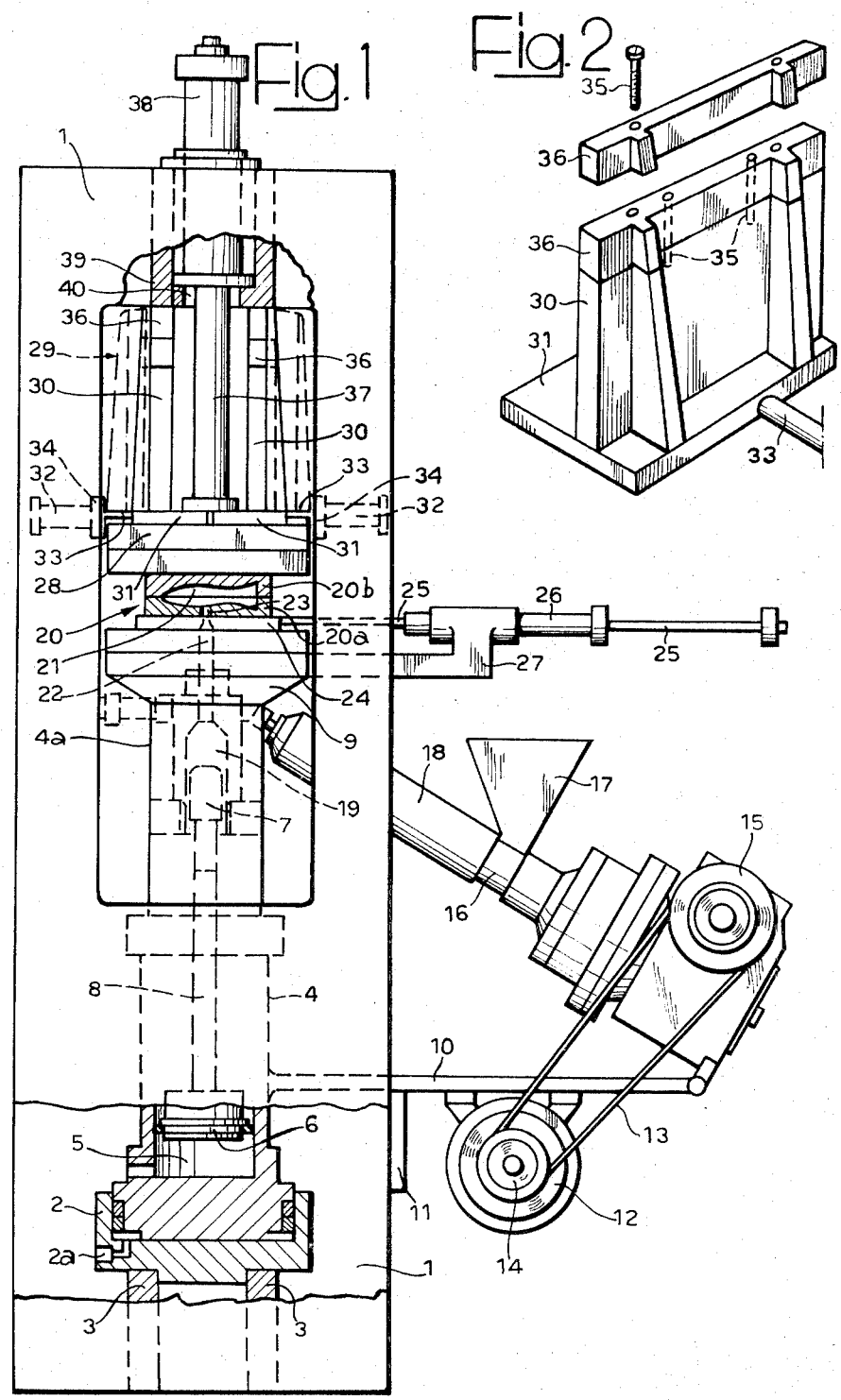

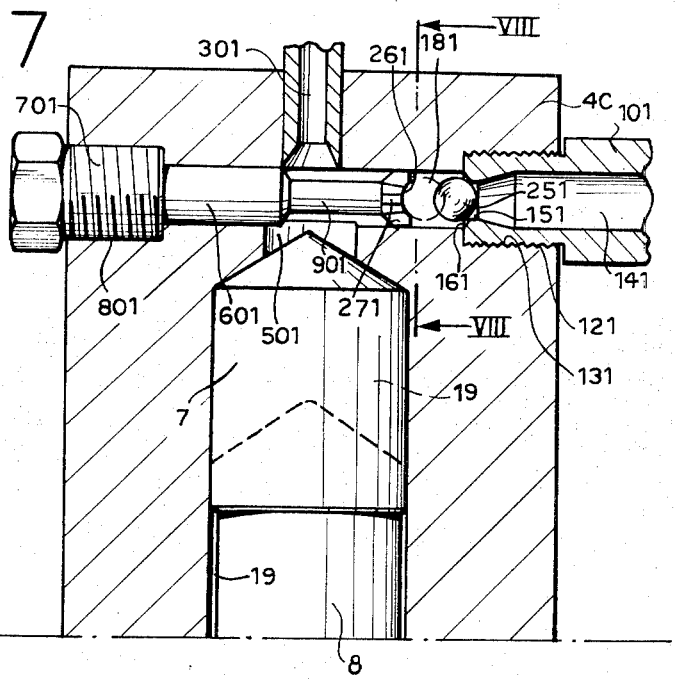
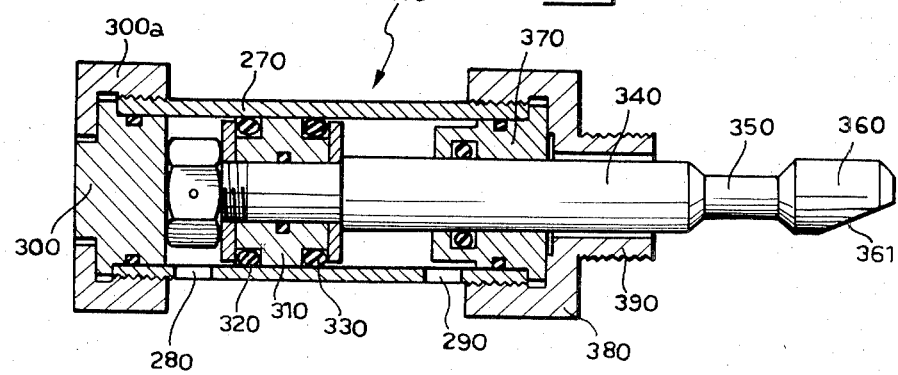
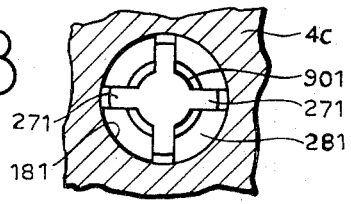

VERTICALLY CLOSING PRESS FOR INJECTION MOLDING THERMOPLASTIC, THERMOSETTING AND ELASTOMERIC MATERIALS

The invention relates to a vertically closing press for injection molding thermoplastic, thermosetting and elastomeric materials.

It is known that presses of this type are increasingly adopted on account of the advantages they afford over horizontally closing injection molding presses, namely a) possibility of employing any light or heavy weight, simple or compound molds with or without withdrawable mandrels; b) possibility of employing structurally simpler, hence cheaper molds; c) no or negligible influence of the mold weight on the mold closing system; d) considerable reduction in size of the press.

Vertically closing injection presses presently in use essentially comprise a vertically extending frame supporting a pair of vertically aligned die-carrying platens, one of which at least is movable in the direction of the vertical axis of the press, and a device, mostly of the screw-type for feeding to a transfer chamber a measured amount of moldable material. In vertically closing presses more sophisticated in structure and operation, the movement of the movable die-carrying platen is effected by means of hydraulic cylinder-piston units. To this end, more particularly in presses in which the movable die is the upper die, the frame supports at a location above the upper platen a pair of cylinder-piston units for a quick approach of the upper die to the lower die and a further cylinder-piston unit for clamping the dies together during injection-molding of the elastomeric material. The latter unit is usually of large size on account of the high pressures reached during injection-molding of the material, which tend to remove the dies from their closed position. In addition to the above cylinder-piston units, a vertically closing press carries at the top of the frame at the top of the frame at least one reservoir for the hydraulic fluid necessary for operation of the said units.

The above-depicted arrangement, which is currently adopted on conventional vertically closing presses is objectionable on account of the heavy weight (due to cylinder-piston units, oil-reservoir) to be supported by the frame at a given level as well as of the large amount of circulating oil required for satisfactory operation of the press. Consequently, a vertically closing press should generally necessarily be made particularly sturdy to afford a satisfactory stability in operation, more particularly when the press is designed for a large daily output.

It is further known that injection molding presses are generally equipped with two relatively movable die-carrying platens, each of which has associated therewith a mold half (die) provided with an impression of the workpiece to be molded.

Depending upon the size of the workpiece the two dies obviously vary in height, so that the approach strokes of the dies for closing the mould and subsequently opening it, as well as the stroke of a platen for applying the clamping thrust should be modified and adjusted to suit the height of the mold installed in the press.

This requirement is met in conventional injection molding presses by providing long operating strokes for the pistons for both approach and withdrawal of the platens as well as of the piston applying the mold-clamping thrust to the platens. Since the latter piston operates in a cylinder of large cross sectional area the oil volume required for applying to the piston an adequate clamping thrust at a given operating pressure is rather high in order to cope with both long and short stroke lengths depending upon the height of the mold used.

The above gives rise to difficulties in operation and necessitates an oversize of the mold operating and working fluid circulating members.

An object of this invention is to provide a vertically closing press for injection molding of elastomeric material obviating the above drawbacks by avoiding large-size and heavy-weight superstructures peculiar to conventional presses, and to afford an improved operation and flexibility in performance over conventional presses. A further object of the invention is to provide an injection molding press making possible the use of variable height molds, the operating stroke of the mold-closing and clamping piston being constant and of minimum length, whichever the height of the mold used.

To this end and with further objects in view which will be understood from the following description the vertically closing press according to the invention for injection molding of thermoplastic or thermosetting or elastomeric materials generally, more particularly rubber, comprises a vertically extending frame, a pair of die-carrying platens arranged in the frame above each other for vertical approach and withdrawal movements, hydraulic fluid-operated means for a quick approach of the upper platen to the lower platen, an injection nozzle extending upwardly through the lower platen, a transfer chamber for moldable material fixedly secured to said lower platen substantially in alignment with said nozzle with which it is in communication, the press being characterized by the fact that the frame carries beneath said transfer chamber a first vertically arranged cylinder-piston unit, the movable element of which is securedly connected to the lower platen said movable element forming the cylinder of a further vertically arranged cylinder-piston unit, the piston rod of which has its top end slidably and sealingly arranged in said transfer chamber to form a transfer plunger in the latter, a screw-processing unit fast with said movable element of said firstmentioned cylinder-piston unit for charging a predetermined amount of moldable processed material into said transfer chamber, means for intercepting the supply of processed material to the transfer chamber during injection into the molds, and means for disconnecting the transfer chamber and injection nozzle during charging of the processed material by the processing unit into the transfer chamber.

The press is further characterized by the fact of comprising, in combination, at least one adjustable backing-up device associated with a first platen, means for displacing said platen together with said backing-up device in order to effect approach and closure of the mold, abutment means fast with the press frame abutted by the backing-up device in the closed position of the mold only and in the direction of the thrust applied to the mold for closure thereof, a piston associated with a second platen for applying the mold-closing and clamping thrust by performing within its pressure cylinder a working stroke which is kept constant independently of the height of the mold placed between the platens.

The invention further provides a two-way valve system adapted to automatically open and close the transfer chamber for the thermoplastic, thermosetting or elastomeric either synthetic or natural material, more particularly rubber, to be injected in an injection molding press of the so-called separate screw and piston type. The valve system first connects the transfer chamber with its feed means for the plasticized material, next disconnects them and allows the material to flow from the transfer chamber to the mold cavity by injection through a suitable nozzle.

According to a first embodiment of the valve system fresh material can be charged to the transfer chamber in an open condition of the mold for discharge of the previous molding, which results in operation of the overlapping type. According to a second and third embodiment overlap is not obtainable, but other important advantages residing in simplicity of construction are attained.

Figure 5:
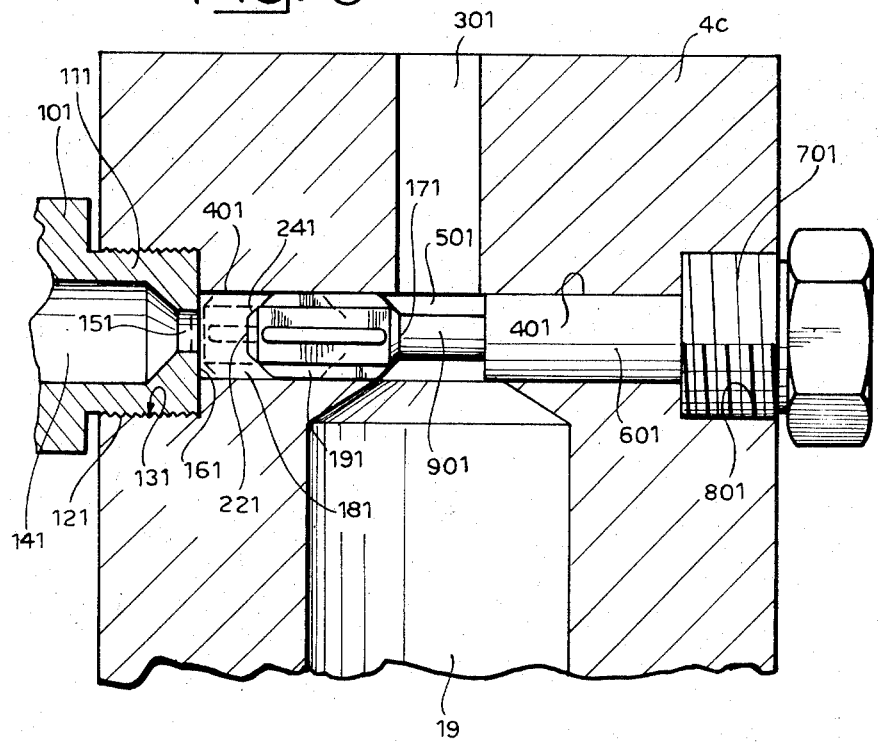
Figure 6:
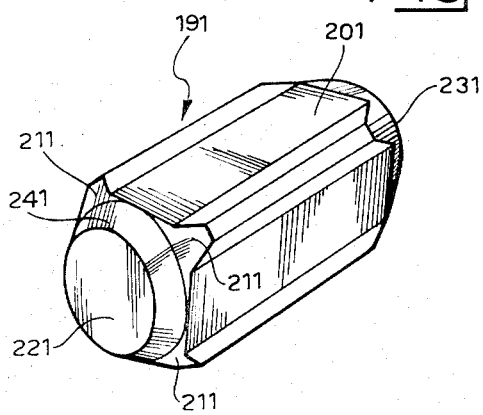

The invention shall be described with reference to the accompanying drawings, given by way of example only, wherein:

FIG. 1 is a part sectional elevational view of an injection molding press according to the invention, FIG. 2 is a perspective view of an embodiment of the adjustable backing-up device, FIG. 3 is a vertical sectional part view on an enlarged scale of a bottom portion of the vertically closing press, FIG. 4 is a sectional view on an enlarged scale of an embodiment of the valve system for charging the transfer chamber for overlapping operation, FIG. 5 is a vertical sectional view of an embodiment of the valve system for non-overlapping operation, FIG. 6 is a perspective view of the intercepting member for the embodiment shown in FIG. 5, FIG. 7 is a vertical sectional view of a further embodiment of the valve system for non-overlapping operation, FIG. 8 is a cross-sectional view on line VIII—VIII of FIG. 7.

Referring to FIGS. 1; 2 and 3, the vertically closing injection molding press comprises a frame 1 extending in vertical direction carrying the various operating members of the press, namely from the bottom in an upward direction, a pedestal 3 supporting a single-acting cylinder 2 for producing the mold closing and clamping thrust by means of a piston 4 provided with sealing rings 4a and 4b (FIG. 3). The piston 4 is hollow to form a double-acting cylinder 5 having inlet and outlet ports 5a and 5b, and has movable therein a piston 6 provided with sealing rings 6a, 6b. The end portion 7 of the rod 8 of piston 6 acts as injection plunger for the material to be molded by being sealingly reciprocable in a transfer chamber 19 aligned therewith. The hollow piston 4 is extended upwardly to support the lower platen 9 and laterally supports by means of a bracket 10 (guided in a guide 11 fast with the frame) the device for plasticizing and charging the material, said device comprising a motor 12 driving through a belt 13 and pulleys 14, 15 a processing screw operating in a cylinder 16. The material stock descends from the hopper 17, is plasticized in the cylinder 16 under the action of heat supplied by a heating jacket 18 and reaches the transfer chamber 19 through an intercepting valve system 19a. The material is injected from the chamber 19 by the action of the end 7 of the piston rod 8 into the cavity 21 of a mold 20 through an injection nozzle 22 carried by the transfer chamber and a sprue 23 in the mold.

The mold comprises two dies 20a, 20b, the former die being associated with the lower platen 9 through the interposition of a mold-discharge system, whereby, when required by the operating cycle of the machine, the mold can be cyclically removed from the machine after the injection nozzle has been moved away from its operating position.

The said system substantially comprises a mold-supporting plate 24 connected to a piston rod 25 of a hydraulic cylinder 26, the latter being supported by a bracket 27 protruding from the frame 1.

The upper die 20b is carried by the upper platen 28 which has additionally associated therewith a pair of adjustable backing-up devices generally denoted by 29 provided to oppose the mold clamping thrust. The devices each comprises a rigid basic block 30 rigidly secured to a plate 31 slidable on the upper platen 28 transversely of the direction of movement of the platens 9 and 28 on guideways not shown on the drawing under the action of hydraulic cylinders 32 having piston rods 33, the cylinders being secured to brackets 34 extending from the platen 28.

Shim blocks 36 are secured by means of screws 35 to each other and to the basic block 30 (FIG. 2) and equal in height a selected fraction of the height of the basic block 30. Each shim block 36 is secured to its underlying block only for individual disassembly and assembly. The upper platen 28 with its backing-up devices 29 is vertically displaceable by a piston rod 37 of a hydraulic cylinder 38 which effects approach and withdrawal of the upper platen 28 towards and away from the lower platen 9. The cylinder 38 is supported by the top portion of the frame 1.

At the highest level which can be reached by the adjustable backing-up devices 29 the frame 1 includes a head portion or beam 39, provided with an aperture 40 to let the piston rod 37 through. In the closed condition of the mold the controls of the press act to bring the devices 29 by their cylinders 32 beneath the head portion 39 (full line position in FIG. 1) and the mold clamping thrust by the cylinder 2 and piston 4 is thus absorbed by said head portion 39. At the mold opening step the adjustable backing-up devices 29 are at first lowered together with platen 28 as the piston 4 moves downwardly and subsequently removed from interference with the head portion 39 by a short lateral displacement caused by cylinders 32 whereby the upper platen 28 may subsequently be raised.

In order to substitute for the mold on the machine another mold differing in height, e.g., a mold exceeding in height the one shown in FIG. 1, one or more of shim blocks 36 in the adjustable backing-up devices 29 are removed to leave between the platens an adequate space for receiving the fresh mold.

If the difference in height of the fresh mold does not match accurately the thickness of one or a plurality of shim blocks 36, an additional adjustment of the platens can be effected by means of the mold clamping piston 4 which can be slightly adjusted in position within the cylinder 2 by admitting or withdrawing a given amount of fluid through the inlet opening 2a in the cylinder. Accordingly, the permissible stroke length of the piston 4 in the cylinder 2 shall be at least equal to the thickness of one of the shim blocks 36 of the adjustable backing-up device 29. Once the platens have been positioned in accordance with the changed height of the mold 20 the mold closing and clamping stroke still effected by the piston 4 is the same as before and as designed for the press.

It will be clear therefore that a coarse adjustment of the press to a change in mold height relies on the change in height of the devices 29, the closing stroke produced by the pressure cylinder (after a final adjustment, if any) remains constant whichever the thickness of the fresh mold mounted in the press.

Referring to FIG. 4, the valve system 19a intercepting the material being charged into the transfer chamber 19 comprises a double-acting hydraulic cylinder 270 having oil inlets 280 and 290 and a removable bottom 300 held by a threaded locking ring 300a, and a piston 310 reciprocable in the cylinder 270 and provided with sealing rings 320 and 330. The piston 310 is fast with a piston rod 340 protruding axially from the cylinder 270 through a removable bottom 370 of said cylinder, the protruding portion of the piston rod being formed with a restriction 350 and a head portion 360 having a lateral slope 361. The removable bottom 370 is locked to the cylinder 270 by means of a threaded lock ring 380 which by an externally threaded cylindrical portion 390 is adapted to be screwed into a recess 250 in the extension 4c (FIG. 3) of the piston-cylinder unit 4 in which the transfer chamber 19 is formed. The head portion 360 is dimensioned to accurately fit into the passage 19b (FIG. 3) interconnecting the screw charger 16 and the transfer chamber 19, so as to stop the flow of plasticized material when the piston 310 is in forward position. The head 360 further disconnects the transfer chamber 19 and its overlying injection nozzle 22 in retracted position of the piston 310. It is thereby possible to fill the transfer chamber 19 even in open condition of the mold by the known overlapping technique.

In FIGS. 5 and 6, which refer to a further embodiment of the intercepting system 19a for charging the transfer chamber 19, the chamber 19 axially opens into a channel 301 leading to the injection nozzle not shown on the drawing. The extension 4c is formed with a diametrical through-bore 401 intersecting the channel 301 preferably in orthogonal direction, the intersecting region being denoted by 501.

A rod 601 extends through the right-hand portion of the through-bore 401, FIG. 5, and is provided with a plug 701 screwed into a tapped recess 801 in the extension 4c.

The end section 901 of the rod 601 extending across the intersecting region 501 is in the form of a preferably cylindrical spigot smaller in diameter than the bore 401 to leave around it an annular passage from the chamber 19 to the channel 301.

The left-hand portion of the bore 401, FIG. 5, is fitted with a connector 101 screwed into a thread 131 in a recess 121 in the extension 4c.

The connector is formed with a conduit 141 opening into the bore 401 by an opening 151. The material to be molded, which has been plasticized in the device already described hereinbefore is fed to the chamber 19 through said conduit 141.

A space 181 is left between the end face 161 of the connector 101 and the end face 171 of the spigot 901, FIG. 5, and receives an intercepting member 191 which is freely reciprocable therein.

The intercepting member 191, FIG. 6, comprises an elongated body 201 from the periphery of which a plurality of axially directed ribs 211 extend having their free edges lying on an imaginary cylindrical surface slightly smaller in diameter than the diameter of the space 181 in which the member 191 is thus freely displaceable.

The ends 221 and 231 of the intercepting member 191 are frustrum-shaped, so that the conical surface 241 can fit into the opening 151 in the connector 101 (as indicated by dash lines in FIG. 5) to close the said opening.

The above described valve system operates automatically under the action of the material being molded. At the step in the press cycle at which the plasticized material is fed through the conduit 141 in the connector 101, the material forces to the right the intercepting member 191 until the latter abuts the face 171 of the spigot 901. Under these conditions the material flows through the gaps between the ribs 211 and reaches the transfer chamber 19 through the aforementioned the annular passage in the intersection region 501.

When the chamber 19 is filled and the press is switched-over to effect injection, the material is forced by the plunger 7 (not shown in FIG. 5) towards the conduit 301 leading to the injection nozzle. During the latter movement the pressure of the material displaces the intercepting member 191 to close the inlet opening 151 by its conical surface 241. The material is thus conveyed towards the channel 301 exclusively.

It should be noted that the plasticized material undergoes a further plasticizing process during charging to the chamber 19 by being extruded through the gaps between the ribs 211 on the intercepting member 191. However, overlapping operation does not take place, since the mold should be closed before the chamber 19 can be charged.

In FIGS. 7 and 8, which show a third embodiment of the intercepting valve system for charging the transfer chamber and transferring material from the latter to the mold, parts corresponding to those of the device shown in FIGS. 5 and 6 are provided with similar reference numerals.

The intercepting member and abutment means therefor are modified, in that said member comprises a ball 251 freely movable (under the thrust exerted by the flow of the material) in the bore 181 between the opening 151 and the end 261 of the spigot 901. The end 261 is formed with radial vanes 271 contacting the inner wall of the bore 181 and leaving therebetween passages 281 through which the material to be molded reaches the transfer chamber 19. In this embodiment too the transfer chamber 19 can be filled only after the mold has been closed.

It will be clear from the above that the vertically closing press according to the invention fully meets the objects stated hereinbefore, especially from the standpoint of an improved operation, reduced size while the output is comparable with that of conventional presses, high stability even on prolonged operation and easy access to all components which facilitates maintenance and adjustment.

What I claim is:

1. A vertically closing press for injection molding of thermoplastic, thermosetting, elastomeric and similar, comprising in combination, a frame, a first and second platen adapted for movement relative to each other, a rigid adjustable back-up device mounted on said first platen and positioned between said first platen and said frame, said first and second platens adapted for operatively supporting an upper and lower die of a mold assembly, a first hydraulic piston and cylinder assembly operatively connected between said frame and said back-up device for displacing said back-up device together with said first platen in the direction of said second platen, said frame having a rigid abutment means adapted for engagement by the side of said back-up device opposite said first platen, displacement means for moving said back-up device in a direction transverse to said first platen between a first position wherein said back-up device is below said abutment means for carrying the mold clamping thrust exerted during engagement of said upper and lower dies and a second position wherein said back-up device is clear of said abutment means to permit displacement of said first platen toward said abutment means, a second piston and cylinder assembly operatively connected between said second platen and the end of said frame opposite said first piston and cylinder assembly, said second cylinder being rigidly secured to said frame and said second piston being operatively connected to said second platen, said second piston and cylinder assembly adapted to be extended to apply a clamping force to said first and second dies.

2. A vertically closing press for injection molding as set forth in claim 1, wherein said back-up device comprises a rigid basic block having a predetermined height and associated with said first platen, and a plurality of auxiliary shim blocks, each having a height equal to a fraction of the basic height of said basic block, said shim blocks arranged in a superposed relation on said base block, and fastening means provided for securing each auxiliary shim block to the immediate underlying block and the lowermost shim block to said basic block.

3. A vertically closing press for injection molding as set forth in claim 1, wherein said displacement means comprises a hydraulic piston and cylinder assembly operatively connected between said frame and said back-up device to move said back-up device in a transverse direction relative to said first platen.

4. A vertically closing press for injection molding as set forth in claim 2, wherein said piston of said second hydraulic piston and cylinder assembly has a stroke at least equal to the thickness of at least one of said shim blocks associated with said basic block of said back-up device.

* * * * *